Patented Feb. 11, 1941

2,231,649

UNITED STATES PATENT OFFICE 2,231,649

ARTIFICIAL RESINS SOLUBLE IN DRYING OILS AND PROCESS OF PRODUCING THE SAME

Werner Wolff, Ludwigshafen-on-the-Rhine, Germany, assignor, by mesne assignments, to General Aniline & Film Corporation, New York, N. Y., a corporation of Delaware No Drawing. Application November 30, 1937, Serial No. 177,255. In Germany December 9, 1936

2 Claims. (Cl. 260—90)

The present invention relates to artificial resins soluble in drying oils and to a process of producing the same.

It is already known that vinyl ethers of abietinol and hydroabietinol can be polymerized by means of acid condensing agents, in particular with boron fluoride or its addition products with ethers, alcohols, acids or water and that generally speaking especially valuable products are obtained in the polymerization of vinyl ethers with the said polymerizing agents by carrying out the polymerization at the lowest possible temperature, advantageously below zero C.

I have now found that contrary to the said rule synthetic resins having valuable properties are obtained by polymerizing vinyl ethers of abietinol or hydroabietinol in the presence of acid reacting condensing agents, preferably of boron fluoride and its addition compounds with ethers, alcohols, acids and water as a polymerization catalyst by carrying out the polymerization at unusually high temperatures, as for example at from 150° to 250° C. The products thus obtained, contrasted with those obtained by polymerization at low temperatures, are soluble in and compatible with drying oils, contrary to expectation. In spite of the high polymerization temperature, the products are obtained in an entirely colorless state. They are neutral and are not turned yellow either by light or heat. In addition to drying oils, such as linseed oil, wood oil and their stand oils, the said products have a good compatibility with numerous oleaginous alkyd resins and yield with the same lacquers having excellent properties. In many cases it is preferable not to start with quite pure abietinol or hydroabietinol vinyl ethers but to use the crude mixture of vinyl ethers obtainable by the catalytic hydrogenation of crude colophony and subsequent treatment of the products with acetylene.

The following example will further illustrate how the present invention may be carried out in practice but the invention is not restricted to this example. The parts are by weight.

Example 1 part of a 1.75 per cent solution of boron fluoride dihydrate in dioxane is gradually added at 215° C. while stirring to 150 parts of dihydroabietinol vinyl ether of 87 per cent purity. Instead of adding the said solution, a corresponding amount of gaseous boron fluoride diluted with nitrogen may be led in. While evolving a moderate amount of heat, the mass becomes increasingly more viscous and after about 8 hours a resin is obtained having an acid value of 0, a softening point of 85° C. according to Krämer-Sarnow and a color value of 2 (iodine method). It is soluble in benzene, toluene, solvent naphtha, cyclohexane, ligroin, lacquer benzine, carbon tetrachloride, cyclohexanol acetate and insoluble in low molecular alcohols, ethers and ketones.

What I claim is:

1. In the process of producing artificial resins by polymerizing a member of the group consisting of abietinol and hydroabietinol vinyl ethers in the presence of an acid reacting condensing agent, the step which comprises carrying out the polymerization by means of a member of the group of boron fluoride and its addition compounds with ethers, alcohols, acids and water as the polymerization catalysts in the liquid phase, at from 150 to 250° C.

2. Polymeric resinous vinyl ethers selected from the group consisting of abietinol and hydroabietinol vinyl ethers soluble in drying oils, obtained in accordance with the process of claim 1.

WERNER WOLFF.